US008687748B2

(12) United States Patent
Chen et al.

(10) Patent No.: US 8,687,748 B2
(45) Date of Patent: Apr. 1, 2014

(54) RADIO FREQUENCY CONTROL FOR COMMUNICATION SYSTEMS

(75) Inventors: Dung-Yun Chen, Tainan (TW); Chin-Fa Hsu, Kaohsiung (TW); Hung-Shiun Fu, Hsin-Chu Hsien (TW); Chung-Shine Huang, Taipei Hsien (TW)

(73) Assignee: Mediatek Inc., Hsin-Chu (TW)

( * ) Notice: Subject to any disclaimer, the term of this patent is extended or adjusted under 35 U.S.C. 154(b) by 1381 days.

(21) Appl. No.: 11/946,279

(22) Filed: Nov. 28, 2007

(65) Prior Publication Data

US 2009/0135955 A1 May 28, 2009

(51) Int. Cl.
 *H04L 27/06* (2006.01)
(52) U.S. Cl.
 USPC ........ 375/344; 375/326; 375/339; 455/151.3; 455/164.1; 455/164.2; 455/165.1; 455/182.1; 455/182.2; 455/183.1; 455/183.2; 455/192.1; 455/192.2; 455/255; 455/257; 455/258
(58) Field of Classification Search
 CPC .............................. H03J 7/026; H04L 27/0014
 USPC .......................... 375/316, 344, 317, 326, 339;
  455/164.1, 164.2, 165.1, 313–316,
  455/258–260, 151.3, 181.3, 182.3, 183.2,
  455/192.1, 192.2, 255, 182.1, 182.2, 183.1,
  455/257, 75, 136, 184.1
 See application file for complete search history.

(56) References Cited

U.S. PATENT DOCUMENTS

| | | | | |
|---|---|---|---|---|
| 5,457,710 A | * | 10/1995 | Miyo et al. | 375/340 |
| 6,038,267 A | * | 3/2000 | Oura et al. | 375/329 |
| 6,480,555 B1 | | 11/2002 | Renard et al. | |
| 6,559,731 B2 | * | 5/2003 | Jakobsson | 331/176 |
| 6,985,705 B2 | * | 1/2006 | Shohara | 455/164.1 |
| 7,474,717 B2 | * | 1/2009 | Lindell et al. | 375/344 |
| 7,711,338 B2 | * | 5/2010 | Ansorge et al. | 455/255 |
| 2005/0079845 A1 | * | 4/2005 | Ansorge et al. | 455/255 |
| 2005/0093638 A1 | | 5/2005 | Lin et al. | |
| 2007/0060083 A1 | | 3/2007 | Oh | |
| 2007/0133994 A1 | * | 6/2007 | Chi | 398/115 |

FOREIGN PATENT DOCUMENTS

| | | |
|---|---|---|
| DE | 691 18 940 T2 | 10/1996 |
| EP | 0 441 593 | 8/1991 |

OTHER PUBLICATIONS

English language translation of abstract of DE 691 18 940 T2 (published Oct. 2, 1996).

* cited by examiner

*Primary Examiner* — Sophia Vlahos
(74) *Attorney, Agent, or Firm* — McClure, Qualey & Rodack, LLP

(57) ABSTRACT

An electronic device capable of performing automatic frequency control (AFC) to maintain frequency and timing without good received bursts, in which an oscillation unit and a baseband processing unit are provided. Wherein, the baseband processing unit computes a compensation adjustment according to a prediction model and stored information regarding a previous digital value adjustment when detecting that the baseband processing unit is incapable of controlling the oscillation unit according to received bursts from the remote communication unit, and adjusts the oscillation unit according to the determined compensation adjustment.

22 Claims, 7 Drawing Sheets

RADIO FREQUENCY CONTROL FOR COMMUNICATION SYSTEMS

BACKGROUND OF THE INVENTION

1. Field of the Invention

The invention relates to communication systems, and in particular to electronic devices and methods for improvement of radio transmitter and receiver frequency accuracy of a local radio communication unit that communicates with a remote communication unit.

2. Description of the Related Art

Communication systems often comprise a plurality of local units such as radiotelephone handsets that communicate digital data by radio transmissions with a remote unit such as a cellular phone base station. The radio frequencies of the communication channels and frequency error tolerances for transmissions on the channels are typically specified by regulatory rules. The frequency tolerances ensure that the level of radio interference between channels is tolerable and that accurate data demodulation is possible at the local unit and the remote unit. In the base stations, the transmitter and receiver radio frequencies are typically phase locked to very stable reference oscillator signals available, in order to meet regulated radio frequency tolerances. However, the cost of the stable reference oscillators is typically very high for radiotelephone handsets. As such, provision for accurate transmitter and receiver frequencies in the local unit at the lowest possible cost is important.

For local communication units, the conventional solution for accurate radio frequencies is to use a relatively low cost voltage controlled crystal oscillator (VCXO) to serve as a reference oscillator, wherein the oscillator frequency is approximately linearly related to the magnitude of a VCXO control voltage. Sometimes, the VCXO control voltage is adjusted based on estimated radio frequency error of the receiver in accordance with well known feedback control principals, such that the radio frequency errors of the receiver and transmitter are sufficiently reduced by feedback control principals. The methodology for radio frequency control in the local unit is a conventional automatic frequency control (AFC) loop.

BRIEF SUMMARY OF THE INVENTION

Embodiments of an electronic device capable of communicating with remote communication units are provided, in which an oscillation unit and a baseband processing unit is provided. Wherein, the baseband processing unit computes a compensation adjustment according to a prediction model and stored information regarding a previous adjustment of a digital value when detecting that the baseband processing unit is incapable of controlling the oscillation unit according to received bursts from the remote communication unit, and adjusts the oscillation unit according to the determined compensation adjustment.

The invention provides an embodiment of a method for controlling an oscillation unit in an electronic device communicating digital data with a remote communication unit. A compensation adjustment is determined according to a prediction model and stored information regarding a previous adjustment of a digital value when detecting incapable of controlling the oscillation unit according to received bursts from the remote communication unit. The oscillation unit is adjusted according to the determined compensation adjustment.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In some conditions, for example, passing through a tunnel, entering a cellar, and the similar, local units (i.e., radiotelephone handsets) cannot receive a good burst from remote units (i.e., base station) and thus, the automatic frequency control (AFC) digital control logic in the local units cannot accordingly adjust frequency of VCXO based on estimated radio frequency error of the receiver. Further, VCXOs have many error contributors, but the most dominant source is VCXO temperature characteristic. Since the local units cannot receive a good burst from the remote units, the transmission power thereof causes the variation of temperature and frequency of VCXO therein will seriously drift which may cause call drop. Embodiments of the invention can maintain frequency of VCXOs according to one or more calculated frequency errors in a normal state. Otherwise, in a reception gap state (i.e. when receiving no good bursts), embodiments of the invention can also periodically generate a new digital value to maintain the frequency of VCXOs according to a prediction model with the last adjustment of the digital value in a fixed period. It is to be understood that the last adjustment of digital value corresponds to the calculated frequency errors in response to the last received bursts, which may be stored in a memory or storage device.

Figure 1:
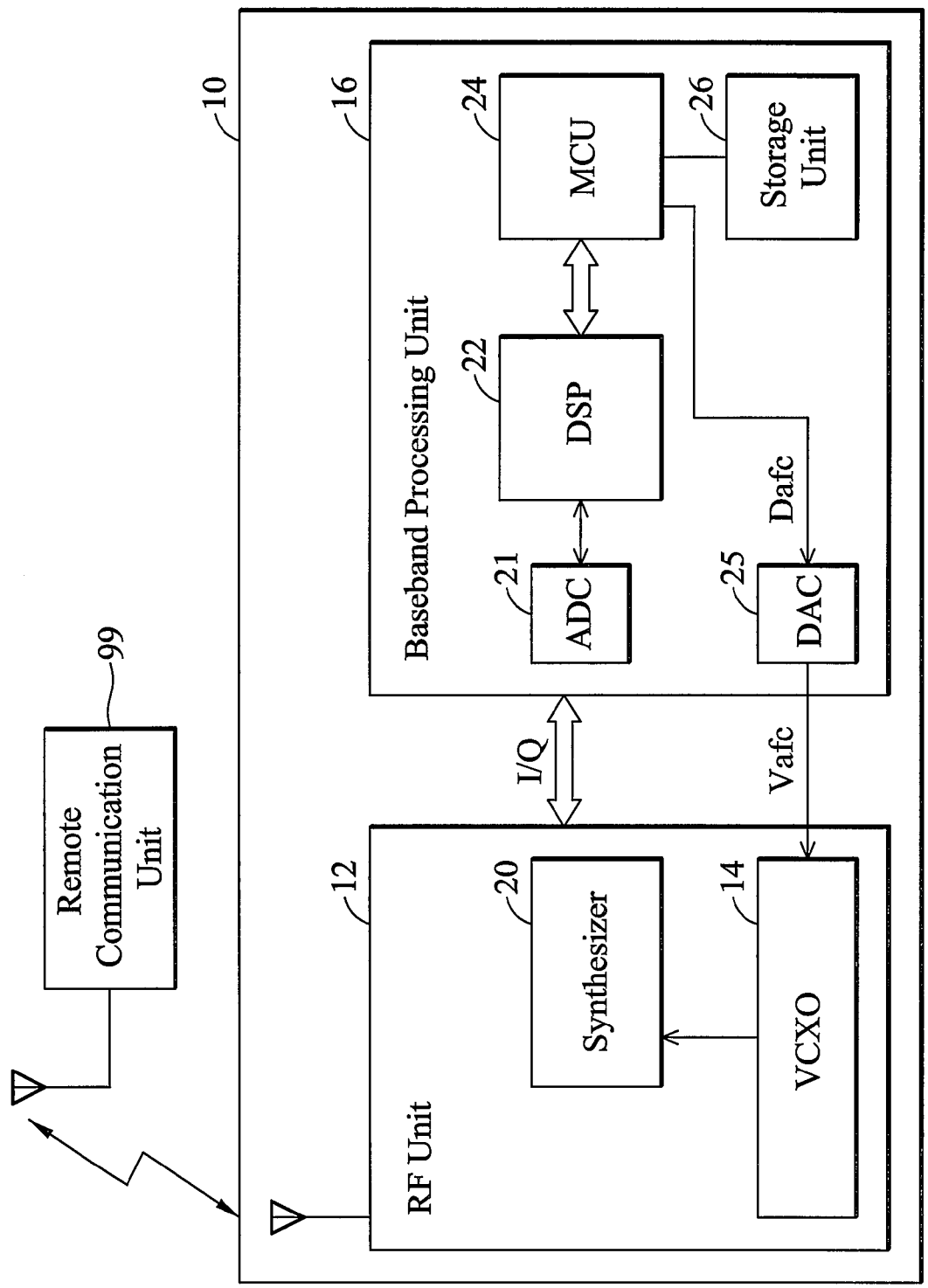
FIG. 1 is a block diagram illustrating a hardware environment according to an embodiment of the invention.

FIG. 1 is a block diagram illustrating a hardware environment according to an embodiment of the invention. A local communication unit 10, such as a radiotelephone handset, a cellular phone, a smart phone and the like, communicates with a remote communication unit 99, such as a cellular phone base station. In the embodiment, the local communication unit 10 and the remote communication unit 99 adhere to the Global System for Mobile communications (GSM) standard as an illustrative example. However, the embodiments are not restricted to the GSM standard and apply more generally to any system in which a local communication unit derives a transmitter and receiver frequency by frequency tracking of radio transmissions from the remote station (i.e., cellular phone base station). That is, those skilled in the art may also implement the local communication unit 10 and the remote communication unit adhere to enhanced data rates for global evolution (EDGE), general packet radio service (GPRS), code division multiple access (CDMA), wideband code division multiple access (WCDMA), Wi-Fi, worldwide interoperability for microwave access (WiMAX) standard, and the similar.

As shown in FIG. 1, the remote communication unit 99 transmits bursts (i.e., RF signals) containing voice or data to the local communication unit 10 on an assigned radio channel. The local communication unit 10 comprises a radio frequency (RF) unit 12 having a synthesizer 20 and a voltage-controlled crystal oscillator (VCXO) 14, and a baseband processing unit 16.

The synthesizer unit 20 resident on the RF unit 12 receives the bursts (RF signals) from the remote communication unit 99 and transmits bursts (RF signals) to the remote communication unit 99. For example, the RF unit 12 comprises not only the synthesizer 20 but also an RF front end (i.e., a combination of an antenna, a diplexer, a power amplifier, a low noise amplifier and RF filters), a quadrature down converter, a quadrature up converter, and programmable gain amplifiers (PGAs), not shown in FIG. 1.

For downlink operations, the RF front end receives the burst from the remote communication unit 99, performs detection and amplification by a low noise amplifier (not shown) and performs RF filtering. The processed received burst is downconverted in frequency to baseband by the quadrature down converter which provides complex (inphase and quadrature) baseband components. Then, the quadrature downconverter mixes the local oscillator signal with the received burst to generate the complex analog baseband signal. The PGAs amplify the respective analog signals and then the amplified analog signals are processed by the baseband processing unit 16.

For uplink operations, DACs (not shown) convert complex digital signals from the baseband processing unit 16 to analog complex signals and then the transmitter mixes the analog baseband complex signal with the local oscillator to the RF frequency of the assigned transmission channel. Thus, the transmitter mixes the local oscillator signal with the analog baseband complex signals to obtain a (RF) signal at the assigned transmission channel frequency. Then, the RF signal is amplified by power amplifier, filtered, and radiated out by the antenna in the RF front end.

The VCXO 14 controlled (or adjusted) by the baseband processing unit 16 provides oscillation signal to the RF unit 12, and the local oscillation signals of the synthesizer 20 is phase locked to the oscillation signal generated by the VCXO 14, such that the frequency and timing of the RF unit 12 can synchronize with the assigned channel. For example, the VCXO 14 comprises a resistor-capacitor (RC) circuit and a crystal oscillator (not shown), and the frequency of the oscillator signals generated by the VCXO 14 can be controlled (or adjusted) by adjusting the capacitance of the RC circuit. The RC circuit can be controlled by a digital value or an analog signal.

The baseband processing unit 16 controls the VCXO 14 which provide oscillation signal and processes voice and data in the received bursts (RF signals). For example, the baseband processing unit 16 comprises analog-to-digital converters (ADCs) 21, a digital signal processor (DSP) 22, a microcontroller unit (MCU) 24, a digital-to-analog converter (DAC) 25 and a storage unit 26. The ADCs 21 convert the processed analog complex signals to respective digital inphase I and quadrature Q samples. The complex (I, Q) sample pairs of the burst are read by DSP 22 and then the DSP 22 can decode voices or data.

In an embodiment, during a normal state, i.e., the local communication unit 10 can receive good bursts (RF signals) from the remote communication unit 99, the DSP 22 calculates a frequency error according to the received burst and outputs the calculated frequency error to the MCU 24. Then, the MCU 24 generates a digital value Dafc according to the calculated frequency error and stores the digital value Dafc in the storage unit 26. The MCU 24 outputs the generated digital value Dafc to control the frequency of the VCXO 14 through the DAC 25. Namely, the MCU 24 continuously compensates the digital values Dafc according to frequency errors of the received bursts calculated by the DSP 22 to control frequency of VCXO 14 and store the historical digital values with timing information, in the storage unit 26. In addition, the MCU 24 further computes a compensation adjustment (i.e., increment or decrement) of the digital value Dafc in a predetermined time period T and stores the generated adjustment in the storage unit 26.

During a reception gap state, i.e., the local communication unit 10 cannot receive good bursts (RF signals) from the remote communication unit 99, the MCU 24 cannot update the digital value Dafc according to the received bursts. In the reception gap state, according to at least one prediction model and the last compensation adjustment of the digital value Dafc in a predetermined time period T, the MCU 24 periodically updates the digital value Dafc to maintain the frequency of VCXO 14 until the local communication unit 10 reenters the normal state. It is to be understood that the last compensation adjustment of the digital value Dafc is generated lastly according to received bursts (i.e. generated during the normal state). Detailed description of generating the digital value Dafc to adjust frequency of the VCXO 14 will be illustrated later.

The digital value Dafc is used for frequency compensation, such that the frequency of VCXO 14 can synchronize with the frequency of the assigned channel. The DACs 25 convert the digital value Dafc to the analog voltage Vafc, for adjusting the frequency of the VCXO 14. The storage unit 26 stores programs and/or the selected processing parameters, and can be a flash memory, a DRAM or registers, but is not limited thereto. It should be noted that, once the local communication unit 10 reenters to the normal state (i.e., capable for receiving bursts from the remote communication unit 99 again), the baseband processing unit 16 adjusts the frequency of VCXO 14 according to the received bursts.

Figure 2A:
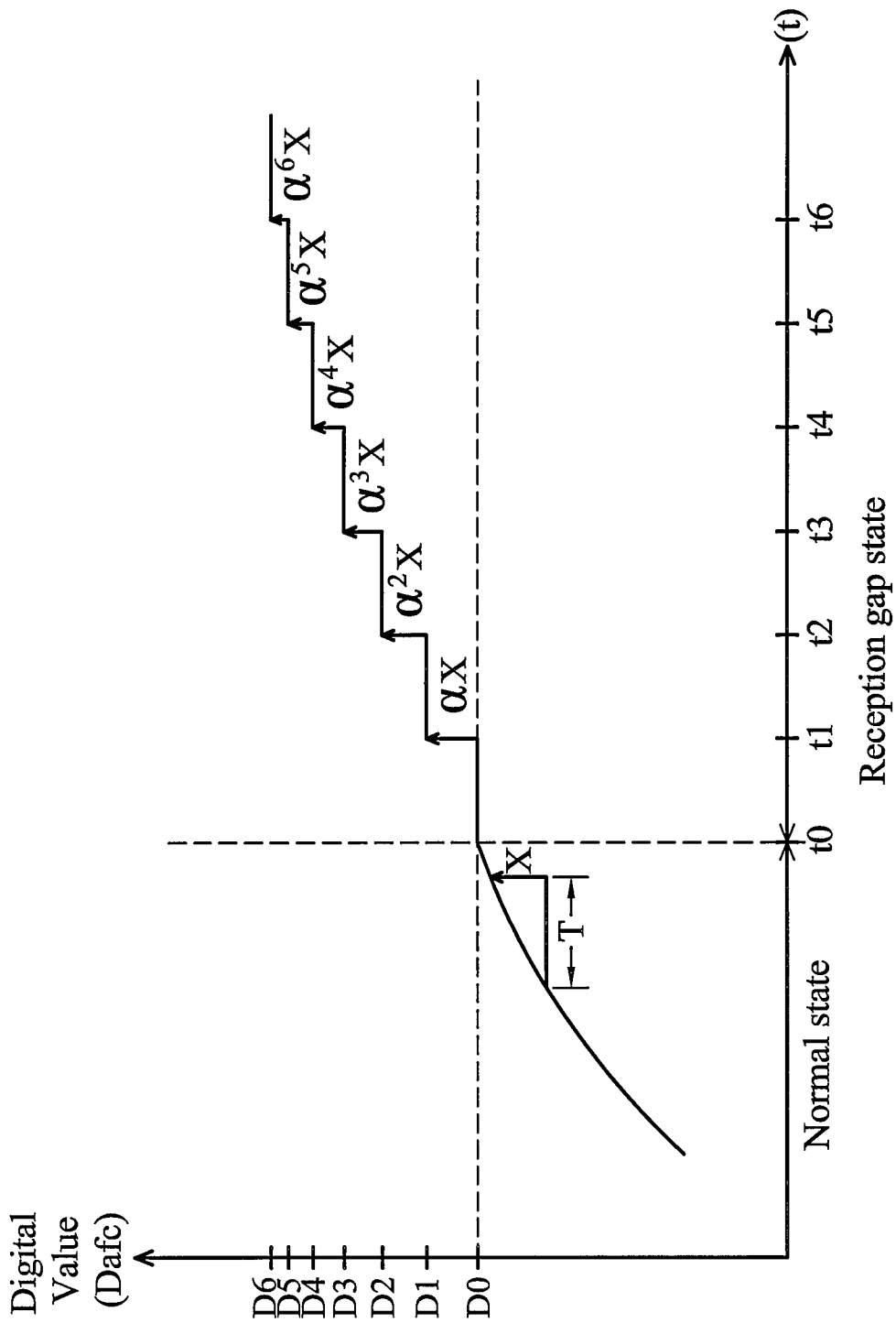
FIG. 2A shows a diagram illustrating adjustment of the VCXO according to an embodiment of the invention.

FIG. 2A shows a diagram illustrating adjustment of the VCXO according to an embodiment of the invention. As shown in FIG. 2A, the MCU 24 continuously updates the digital values Dafc according to frequency errors of the receive bursts calculated by the DSP 22, thereby maintaining frequency of VCXO 14, and store the digital values Dafc in the storage unit 26, in a normal state (i.e., Non-reception gap state). In addition, the MCU 24 compute a compensation adjustment X of the digital value Dafc in predetermined time period T and stores the generated adjustment X in the storage unit 26. The compensation adjustment X of the digital value Dafc represents the difference from a previous digital value of a predetermined period T. In the example, the compensation adjustment of the digital value Dafc is an increment.

When the reception gap state occurs at time t0, the MCU 24 periodically compensates the digital value Dafc to maintain the frequency of VCXO 14 according to a prediction model and the compensation adjustment X of the digital value Dafc of the last period T. For example, the prediction model is $X_{N+1}=\alpha \times X_N$, i.e., the next compensation adjustment $X_{N+1}$ can be obtained by the previous compensation adjustment $X_N$ multiplying by a decaying factor $\alpha$, in which the decaying factor α<1 and α>0. The MCU 24 adds the currently obtained compensation adjustment to the last digital value to obtain a new digital value to update the digital value Dafc.

Namely, the MCU 24 calculates the compensation adjustment at time t1 as α×X, according to the prediction model and the compensation adjustment X of the digital value Dafc for the last period T during the normal state, and then adds the calculated compensation adjustment (i.e., α×X) to the digital value D0 (provided at time t0) to obtain a digital value D1 as the digital value Dafc at time t1. At time t2, the MCU 24 calculates the compensation adjustment at time t2 as $α^2×X$, according to the prediction model and the previous adjustment at time t1 (i.e., α×X), and then adds the obtained compensation adjustment (i.e., $α^2×X$) to the digital value D1 (provided at time t1), to obtain a digital value D2 as the digital value Dafc at time t2.

Similarly, the MCU 24 obtains the compensation adjustments a $α^3×X$, $α^4×X$, $α^5×X$, and $α^6×X$ at times t3~t6, respectively, according to the prediction model, and obtains corresponding digital values to accordingly update digital value Dafc. Namely, during the reception gap state, the MCU 24 outputs the digital values D1~D6 at time t1~t6 as the digital value Dafc, thereby adjusting the frequency of VCXO 14 stepwise to synchronize with the frequency of the assigned channel according to the prediction model and the stored compensation adjustment, rather than receiving bursts from the remote communication unit 99. It is to be understood that the digital value adjustment may avoid call drop resulting from frequency drift caused by temperature variation before reentering to normal state, for example, leaving a tunnel, a cellar, and the similar.

Figure 2B:
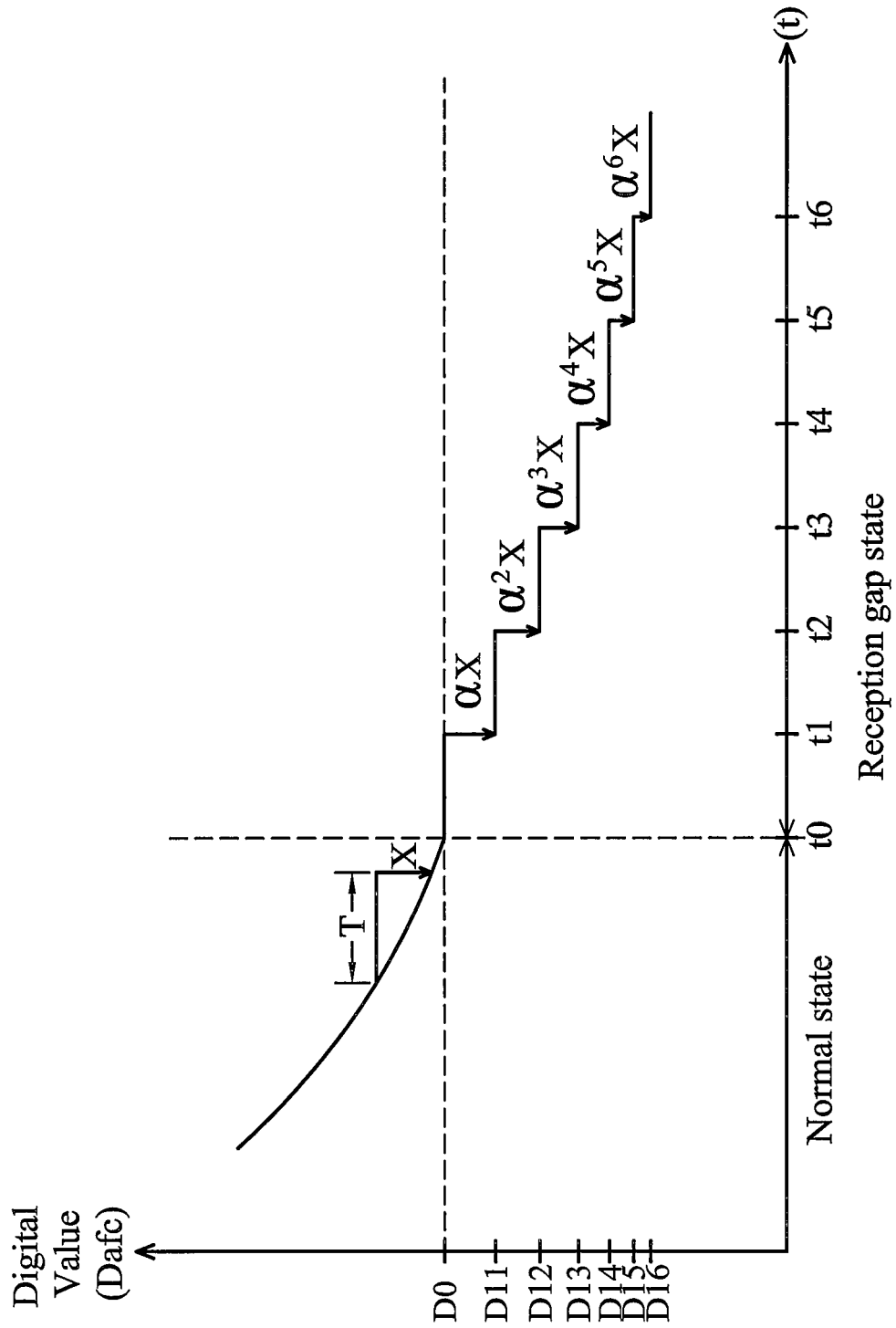
FIG. 2B shows a diagram illustrating adjustment of the VCXO according to an embodiment of the invention.

FIG. 2B shows a diagram illustrating adjustment of the VCXO according to an embodiment of the invention. As shown in FIG. 2B, the MCU 24 continuously decreases the digital values Dafc according to frequency errors of the received bursts calculated by the DSP 22, thereby maintaining frequency of VCXO 14, and stores the digital values Dafc in the storage unit 26, in a normal state (i.e., Non-reception gap state). The MCU 24 computes a compensation adjustment X of the digital value Dafc of time period T and stores the generated adjustment X in the storage unit 26. In the example, the compensation adjustment X of the digital value Dafc is a decrement.

When the reception gap state occurs at time t0, the MCU 24 periodically updates the digital value Dafc to maintain the frequency of VCXO 14, according to a prediction model and the compensation adjustment X of the digital value Dafc for the last period T. According to the prediction model (i.e., $X_{N+1}=αX_N$,) and the compensation adjustment X of the digital value Dafc for the last period T, the MCU 24 calculates the compensation adjustment at time t1 as α×X, in which the decaying factor α<1 and α>0, and then subtracts the calculated compensation adjustment (i.e., α×X) from the digital value D0 (provided at time t0) to obtain a digital value D11 serving as the digital value Dafc at time t1.

At time t2, the MCU 24 calculates the compensation adjustment as $α^2×X$ according to the prediction model and the previous adjustment at time t1 (i.e., α×X), and then subtracts the obtained compensation adjustment (i.e., $α^2X$) from the digital value D11 (provided at time t1) and to obtain a digital value D12 as the digital value Dafc at time t2. Similarly, the MCU 24 respectively obtains the compensation adjustments $α^3×X$, $α^4×X$, $α^5×X$, and $α^6×X$ at times t3~t6 according to the prediction model, and obtains corresponding digital values D13~D16 to accordingly update digital value Dafc. Namely, during the reception gap state, the MCU 24 respectively outputs the digital values D11~D16 at time t1~t6 as the digital value Dafc, thereby adjusting the frequency of VCXO 14 stepwise.

Figure 2C:
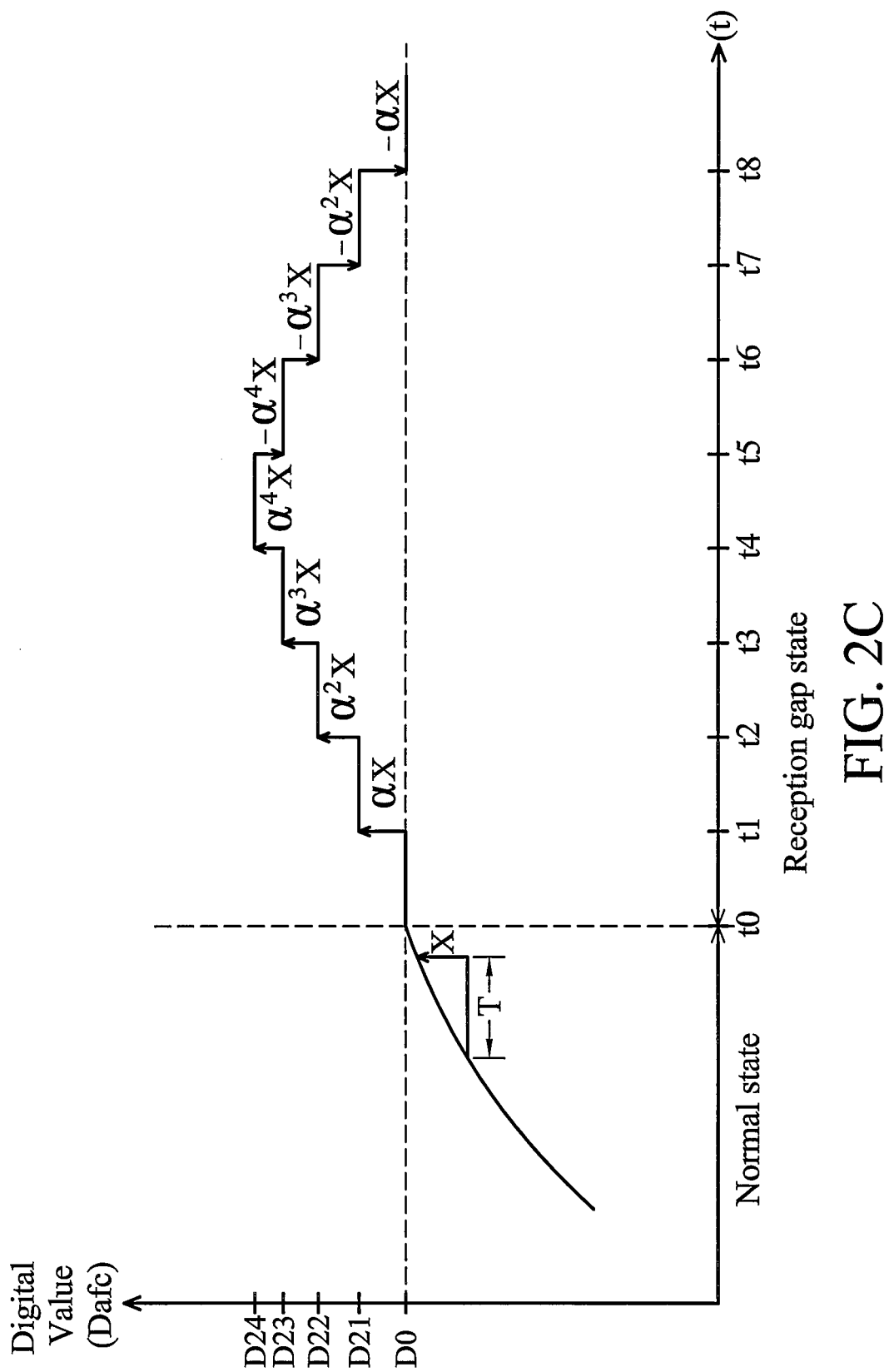
FIG. 2C shows a diagram illustrating adjustment of the VCXO according to an embodiment of the invention.

FIG. 2C shows a diagram illustrating adjustment of the VCXO according to an embodiment of the invention. As shown in FIG. 2C, according to the received burst from the remote communication unit 99, the MCU 24 continuously adjusts the digital values Dafc according to frequency errors of the received bursts calculated by the DSP 22, thereby maintaining frequency of VCXO 14, and stores the digital values Dafc in the storage unit 26, in a normal state (i.e., Non-reception gap state). Similarly, the MCU 24 computes a compensation adjustment X of the digital value Dafc of time period T and stores the generated adjustment X in the storage unit 26. In the example, the MCU 24 selectively utilizes one of a plurality of predication models to update the digital value Dafc to maintain the frequency of VCXO 14. For example, when a reverse condition is not satisfied, the MCU 24 updates the digital value Dafc according to a first prediction model. Conversely, when the reverse condition is being satisfied, the MCU 24 updates the digital value Dafc according to a second prediction model. After the reverse condition has been satisfied, the MCU 24 updates the digital value Dafc according to a third prediction model.

When the reception gap state occurs at time t0, the MCU 24 updates the digital value Dafc to maintain the frequency of VCXO 14 according to a first prediction model and the compensation adjustment X of the digital value Dafc for the last period T. The first prediction model is $X_{N+1}=αX_N$, in which the decaying factor α<1 and α>0. Hence, the MCU 24 computes the compensation adjustment at time t1 as α×X, and then adds the calculated compensation adjustment (i.e., α×X) to the digital value D0 (provided at time t0) to obtain a digital value D21 serving as the digital value Dafc at time t1. In addition, the MCU further detects whether the obtained digital value reaches (or exceeds) a predetermined maximum to determine if the reverse condition is satisfied. Because the digital value D21 is less than the predetermined maximum, the reverse condition is not satisfied at time t1.

At time t2, the MCU 24 computes the compensation adjustment as $α^2×X$, according to the first prediction model and the previous adjustment at time t1 (i.e., α×X), and then adds the obtained compensation adjustment (i.e., α×X) to the digital value D21 (provided at time t1) to obtain a digital value D22 serving as the digital value Dafc at time t2. Because the digital value D22 is less than the predetermined maximum, the reverse condition is not satisfied at time t2. The generation of digital Dafc values D23 and D24 at times t3 and t4 can be deduced by analogy, and only briefly described herein. Because the digital value D24 reaches (or exceeds) the predetermined maximum, the reverse condition is being satisfied at time t4 and thus, the MCU 24 utilizes a second prediction model to update the digital value Dafc for the next time period.

At time t5, as the second prediction model is $X_{N+1}=-X_N$ and the previous adjustment is a $α^4×X$, the MCU 24 calculates the compensation adjustment at time t5 as $-α^4×X$, and then adds the obtained compensation adjustment (i.e., $-α^4×X$) to the digital value D24 (provided at time t4) to obtain the digital value D23 serving as the digital value Dafc at time t5. Because the reverse condition has been satisfied after time t5, the MCU 24 then utilizes a third prediction model to update the digital value Dafc for the next time period.

At time t6, as the third prediction model is $$X_{N+1} = \frac{X_N}{\alpha}$$

and the previous adjustment is $-\alpha^4 \times X$, the MCU 24 computes the compensation adjustment at time t6 as $-\alpha^3 \times X$, and then adds the obtained compensation adjustment (i.e., $-\alpha^3 \times X$) to the digital value D23 (provided at time t5) to obtain a digital value D22 as the digital value Dafc at time t6. Similarly, the MCU 24 obtains the compensation adjustments $-\alpha^2 \times X$ and $-\alpha \times X$ at times t7 and t8, respectively, according to the third prediction model and obtains corresponding digital values D21 and D0 to accordingly update the digital value Dafc.

Namely, the compensation adjustment of the digital value Dafc follows an increment pattern before time t5, and the compensation adjustment of the digital value Dafc follows a decrement pattern after time t5.

Figure 2D:
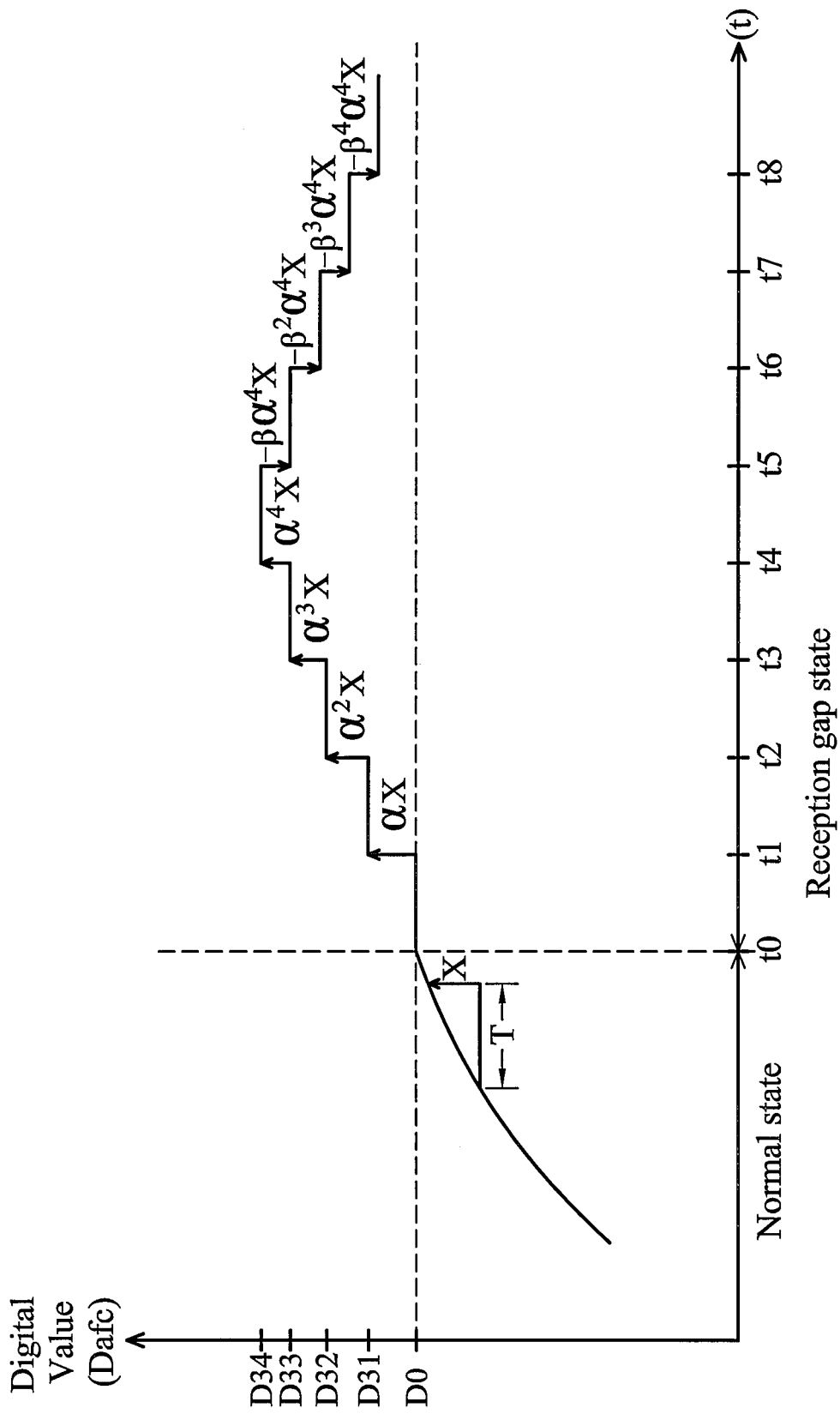
FIG. 2D shows a diagram illustrating adjustment of the VCXO according to an embodiment of the invention.

FIG. 2D shows a diagram illustrating adjustment of the VCXO according to an embodiment of the invention. As shown in FIG. 2D, the MCU 24 continuously adjusts the digital values Dafc according to frequency errors of the received bursts calculated by the DSP 22, thereby maintaining the frequency of VCXO 14, and stores the digital values Dafc in the storage unit 26, in a normal state (i.e., Non-reception gap state). Similarly, the MCU 24 computes a compensation adjustment X of the digital value Dafc of time period T and stores the generated adjustment X in the storage unit 26. In the example, the MCU 24 selectively utilizes one of a plurality of predication models to update the digital value Dafc to maintain the frequency of VCXO 14. For example, when a reverse condition is not satisfied, the MCU 24 updates the digital value Dafc according to the first prediction model as described above. When the reverse condition is being satisfied, the MCU 24 updates the digital value Dafc according to a fourth prediction model. After the reverse condition has been satisfied, the MCU 24 updates the digital value Dafc according to a fifth prediction model.

At times t1~t4, the operations of the MCU 24 is similar to that shown in FIG. 2C and thus, detailed descriptions are omitted for brevity. Because the digital value D24 at time t4 reaches (or exceeds) the predetermined maximum, the reverse condition is being satisfied at time t4 and thus, the MCU 24 then utilizes a fourth prediction model to update the digital value Dafc for the next time period.

At time t5, as the fourth prediction model is $X_{N+1} = -\beta \times X_N$, and the previous adjustment is $\alpha^4 \times X$, the MCU 24 calculates the compensation adjustment at time t5 as $-\beta \times \alpha^4 \times X$, and then adds the obtained compensation adjustment (i.e., $-\beta \times \alpha^4 \times X$) to the digital value (provided at time t4) to obtain a digital value as the digital value Dafc at time t5. For example, the decaying factors are $0 < \beta < \alpha < 1$. At time t6, as the fifth prediction model is $X_{N+1} = \beta \times X_N$, and the previous adjustment is $-\beta \times \alpha^4 \times X$, the MCU 24 calculates the compensation adjustment at time t6 as $-\beta^2 \times \alpha^4 \times X$ according to the fifth prediction model and the previous adjustment, and then adds the obtained compensation adjustment (i.e., $-\beta^2 \times \alpha^4 \times X$) to the previous digital value (provided at time t5) to obtain a digital value D33 as the digital value Dafc at time t6.

Similarly, the MCU 24 obtains the compensation adjustments $-\beta^3 \times \alpha^4 \times X$ and $-\beta^4 \times \alpha^4 \times X$ at times t7 and t8, respectively, and obtains corresponding digital values to accordingly update the digital value Dafc. The compensation adjustment of the digital value Dafc follows an increment pattern before time t5, and the compensation adjustment of the digital value Dafc follows a decrement pattern after time t5, where the increment pattern with a greater slope than that of the decrement pattern.

Figure 3:
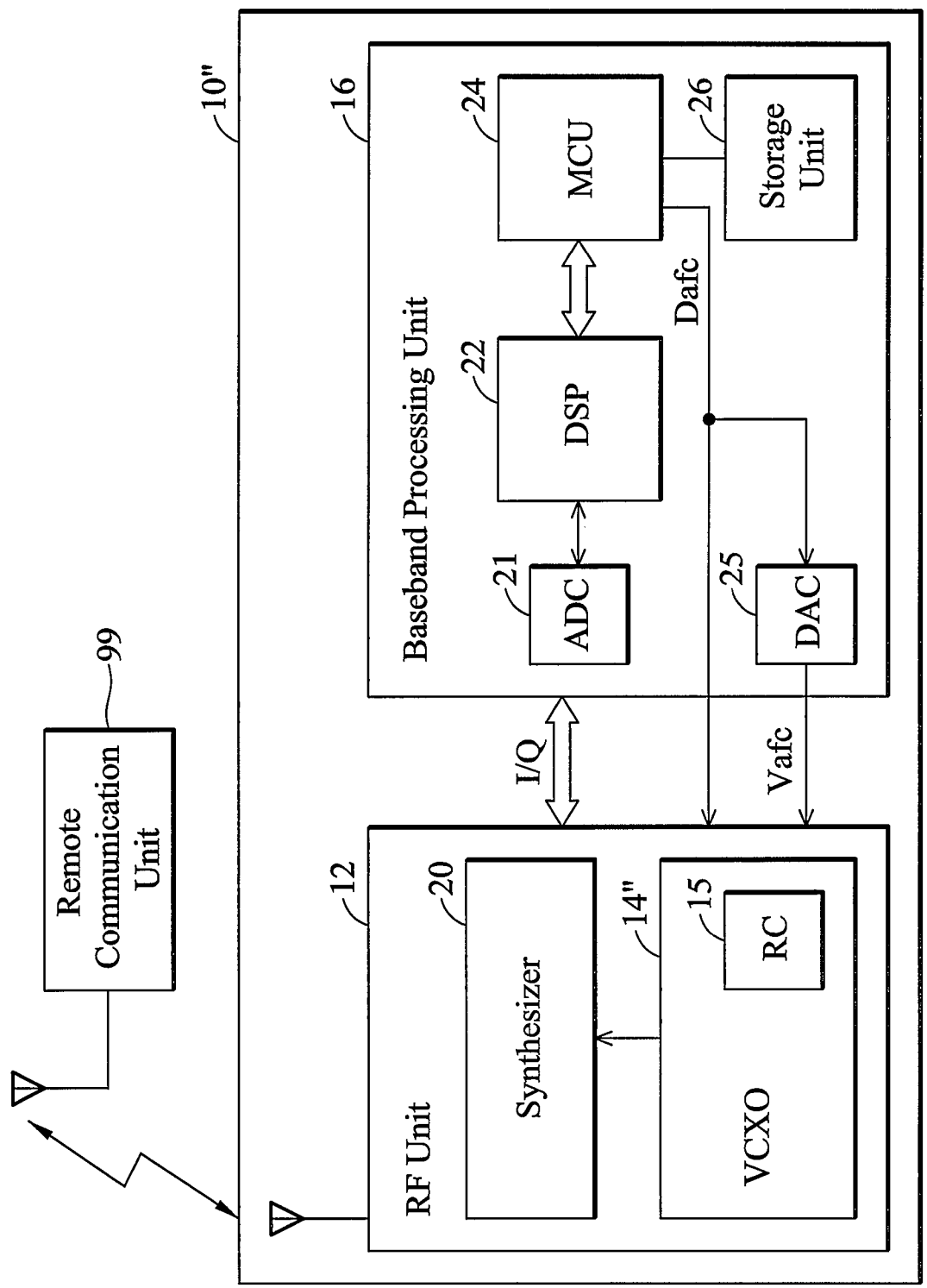
FIG. 3 is a block diagram illustrating a hardware environment according to an embodiment of the invention.

FIG. 3 is a block diagram illustrating a hardware environment according to an embodiment of the invention. As shown, a local communication unit 10" is similar to the local communication unit 10 shown in FIG. 1, the VCXO 14 can be controlled by the digital value Dafc and/or the analog voltage Vafc from a baseband processing unit 16. The VCXO 14" comprises a RC circuit 15 and a crystal oscillator (not show), and the frequency of the oscillator signals generated by the VCXO 14" can be adjusted by adjusting the capacitance of the RC circuit 15.

The RC circuit 15 can be controlled by a digital value Dafc or an analog voltage Vafc. For example, the capacitive element (not shown) in the RC circuit 15 is a voltage controlled element, and the capacitance of the RC circuit 15 can be adjusted by the analog voltage Vafc (i.e., automatic frequency control voltage) from the baseband processing unit 16. In some embodiments, the capacitive element in the RC circuit is a capacitor. matrix controlled by a digital signal. Additionally, the capacitance of the RC circuit can be adjusted by a digital value Dafc directly. Namely, when the capacitance of the RC circuit can be adjusted by a digital value Dafc directly, the DAC 25 can be omitted. In some embodiments, the DAC 25 can be integrated into the RF unit 12 for converting the digital value Dafc to the analog voltage Vafc. Structures and operations of the local communication unit 10" similar to that of the local communication unit 10 are omitted for brevity.

Figure 4:
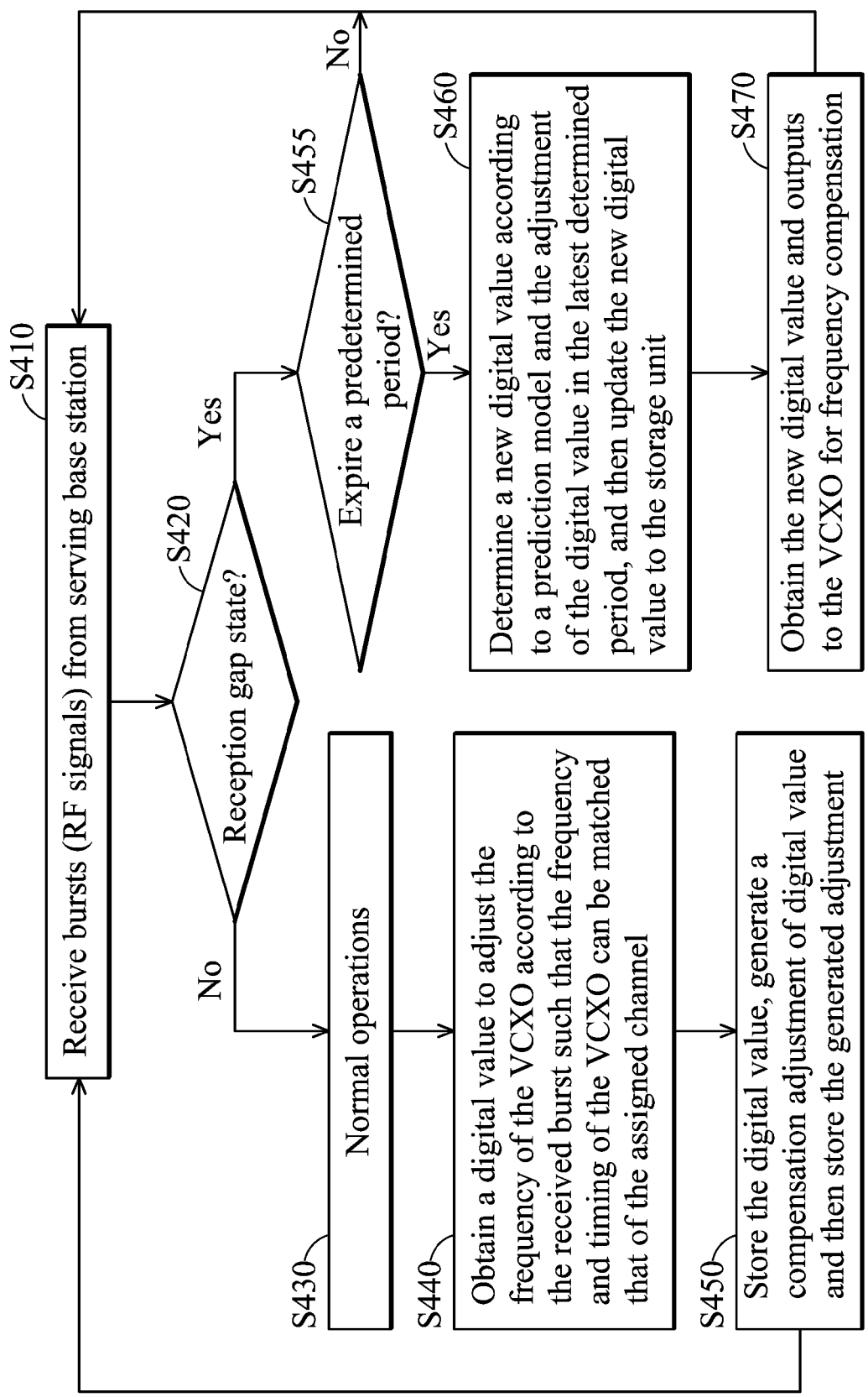
FIG. 4 is a flowchart illustrating an embodiment of a method for maintaining the frequency of the VCXO.

FIG. 4 is a flowchart illustrating an embodiment of a method for maintaining the frequency of VCXO according to an embodiment of the invention. Referring to FIG. 4, in step S410, the RF unit 20 in the local communication unit 10 receives bursts (RF signals) from the remote communication unit 99. Then, the RF unit 12 mixes the local oscillator signal with the received burst to generate the complex analog baseband signals which are output to the baseband processing unit 16.

In step S420, the MCU 24 determines whether a reception gap state occurs according to the burst received by the RF unit 20. For example, the ADCs 21 converts the processed complex baseband signals to respective digital inphase I and quadrature Q samples which are processed by DSP 22. MCU 24 determines the occurrence of the reception gap state according to whether a series of bad bursts are received by the local communication unit 10. When a series of bad bursts are received by the local communication unit 10, the MCU 24 determines that the gap state has occurred. The MCU 24 may detect the reception power of the local communication unit 10, and signal to noise rate (SNR) of the received burst and decide whether a reception gap state has occurred. When the detected reception power is lower than a threshold value and/or the SNR of the received burst is lower than a threshold value, the reception gap has occurred. Otherwise, it means that the local communication unit 10 can receive good bursts (RF signals) from the remote communication unit 99. Namely, the local communication unit 10 operates in a normal state, then step S430 is executed. Conversely, if the reception gap state occurs, it means that the local communication unit 10 cannot receive good bursts (RF signals) from the remote communication unit 99, and then step S455 is executed.

In step S430, normal operations are executed. For example, the DSP 22 obtains voices or data according to the burst sample sequences from the ADCs 21. In step S440, the MCU 24 obtains a digital value Dafc to adjust the frequency of VCXO 14 according to the received bursts, such that the frequency of VCXO 14 can synchronize with the remote communication unit 99. Namely, an automatic frequency control (AFC) method is executed. For example, the DSP 22 computes the frequency error between the remote communication unit 99 and the local communication unit 10 according to the received burst (sample sequences) from the RF unit 12 and outputs the determined frequency error to the MCU 24.

The MCU 24 then generates a digital value Dafc according to the determined frequency error, and the MCU 24 computes the digital value Dafc to control the frequency of VCXO 14. As shown in FIG. 1, the digital value Dafc can be converted to the analog voltage to control the VCXO 14 by the DAC 25, such that the frequency of VCXO 14 can synchronize with the remote communication unit 99. As shown in FIG. 3, the digital value Dafc can also be output to the VCXO 14" to adjust (or control) the capacitance of the RC circuit (known as DCXO).

In step S450, the MCU 24 stores the digital value Dafc in the storage unit 26 and generates a compensation adjustment (i.e., increment or decrement) of digital value Dafc and stores the generated adjustment in the storage unit 26. Then, the method returns to step S410, i.e., the RF unit 12 receives another burst from the remote communication unit 99 again, thereby dynamically adjusting digital value Dafc or an analog signal Vafc to maintain the frequency accuracy of VCXO 14 or 14".

In step S455, a predetermined time period has expired. When the time period of the reception gap state has expired, step S460 is executed. On the contrary, when the time period of the reception gap state has not expired, the step S410 is executed to receive another burst from the remote communication unit 99. For example, burst reception and reception gap state determination (i.e. steps S410 and S420) are periodically performed about every 4 ms, and frequency compensation (i.e. steps S460 and S470), during the reception gap state, is periodically performed about every 2 seconds or after receiving 200 bursts.

In step S460, the MCU 24 determines a new digital value Dafc according to a prediction model, and the adjustment of the digital value Dafc for the last period, and then the MCU updates the new digital value Dafc in the storage unit 26. Detailed description of generating the digital value Dafc can be referenced to that shown in FIG. 2A~2D and thus, are omitted for brevity.

In step S470, the MCU 24 obtains the new digital value Dafc and outputs the new digital value Dafc to the VCXO 14 or 14" for frequency compensation. For example, the digital value Dafc can be converted to the analog voltage to control the VCXO 14 by the DAC 25 as shown in FIG. 1 Alternatively, the digital value Dafc can also be output to the VCXO to control the frequency.

In view of the above, the embodiments of the invention not only generates a new digital value to maintain frequency of VCXO according to the calculated frequency error in a normal state, but also periodically generates a new digital value to maintain the frequency of VCXO according to a prediction model and the adjustment of the digital value for the last pre-determined period, until the local communication unit reenters to a normal state. Hence, the invention can significantly improve the frequency and timing error at reception gap. Thus, call drops resulting from frequency and timing drift caused by temperature variation can be prevented.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device capable of communicating with a remote communication unit, comprising:
   a baseband processing unit computing a first compensation adjustment according to a first prediction model and stored information regarding a previous adjustment of a digital value in a predetermined time period when detecting that the baseband processing unit is incapable of controlling an oscillation unit according to received bursts from the remote communication unit, and adjusting the oscillation unit according to the determined first compensation adjustment, wherein the first prediction model is $X_{N+1}=\alpha \times X_N$, in which $X_N$ and $X_{N+1}$ represent consecutive compensation adjustments, N is a positive integer, $\alpha$ represents a first decaying factor, $\alpha<1$ and $\alpha>0$, $\alpha$ is a constant value in different $X_N$, and the period between $X_{N+1}$ and $X_N$ is constant.

2. The electronic device as claimed in claim 1, wherein the baseband processing unit further updates the digital value by adding or subtracting the determined first compensation adjustment to or from a previous digital value, and adjusts the oscillation unit according to the updated digital value.

3. The electronic device as claimed in claim 2, wherein the baseband processing unit further converts the updated digital value to a voltage and adjusts the oscillation unit according to the voltage.

4. The electronic device as claimed in claim 1, wherein the remote communication unit is a base station system.

5. The electronic device as claimed in claim 1, wherein the baseband processing unit computes a second compensation adjustment according to a radio frequency burst from the remote communication unit, and adjusts the oscillation unit according to the second compensation adjustment.

6. The electronic device as claimed in claim 1, wherein the baseband processing unit detects that the baseband processing unit is incapable of controlling the oscillation unit according to received bursts from the remote communication unit when a reception power of the electronic device is lower than a threshold value.

7. The electronic device as claimed in claim 1, wherein the baseband processing unit detects that the baseband processing unit is incapable of controlling the oscillation unit according to received bursts from the remote communication unit when signal to noise ratio (SNR) of a radio frequency burst is lower than a threshold value.

8. The electronic device as claimed in claim 1, wherein the previous adjustment of the digital value is determined by previously received bursts from the remote communication unit.

9. The electronic device as claimed in claim 1, further comprising a radio frequency (RF) unit comprising a synthesizer, wherein the oscillation unit generates a first oscillation signal to the synthesizer of the RF unit, and the synthesizer generates a second oscillation signal with a frequency which is phase locked to that of the first oscillation signal, such that the frequency of the RF unit synchronizes with that of a channel assigned by the remote communication unit.

10. The electronic device as claimed in claim 2, wherein when detecting that the baseband processing unit is still incapable of controlling the oscillation unit according to received bursts from the remote communication unit, and when a digital value corresponding to the first predetermined compensation adjustment reaches or exceeds a predetermined maximum, the baseband processing unit computes a second compensation adjustment according to a second prediction model and the first compensation adjustment, and adjusts the oscillation unit according to the second compensation adjustment.

11. The electronic device as claimed in claim 10, wherein the second compensation adjustment is less than the first compensation adjustment.

12. The electronic device as claimed in claim 10, wherein when detecting that the baseband processing unit is still incapable of controlling the oscillation unit according to received bursts from the remote communication unit, and when the digital value corresponding to the first predetermined compensation adjustment reaches or exceeds a predetermined maximum, and when the second compensation adjustment is determined, the baseband processing unit computes a third compensation adjustment according to a third prediction model and the second compensation adjustment, and adjusts the oscillation unit according to the third compensation adjustment.

13. A method for controlling an oscillation unit in an electronic device communicating with a remote communication unit, comprising:
  computing a first compensation adjustment according to a first prediction model and stored information regarding a previous adjustment of a digital value in a predetermined time period when detecting that a baseband processing unit is incapable of controlling the oscillation unit according to received bursts from the remote communication unit; and
  adjusting the oscillation unit according to the determined first compensation adjustment, wherein the first prediction model is $X_{N+1}=\alpha \times X_N$, in which $X_N$ and $X_{N+1}$ represent consecutive compensation adjustments, $\alpha$ represents a first decaying factor, $\alpha<1$ and $\alpha>0$, $\alpha$ is a constant value in different $X_N$, and the period between $X_{N+1}$ and $X_N$ is constant, N is a positive integer.

14. The method as claimed in claim 13, further comprising computing a second compensation adjustment according to a radio frequency burst from the remote communication unit.

15. The method as claimed in claim 13, wherein the baseband processing unit is incapable of controlling the oscillation unit according to received bursts from the remote communication unit is detected when a reception power of the electronic device is lower than a threshold value.

16. The method as claimed in claim 13, wherein the baseband processing unit is incapable of controlling the oscillation unit according to received bursts from the remote communication unit is detected when a signal to noise ratio (SNR) of the radio frequency burst is lower than a second threshold value.

17. The method as claimed in claim 13, further comprising:
  updating the digital value by adding or subtracting the determined first compensation adjustment to or from a previous digital value; and
  adjusting the oscillation unit according to the updated digital value.

18. The method device as claimed in claim 17, further comprising:
  converting the updated digital value to a voltage; and
  adjusting the oscillation unit according to the voltage.

19. The method as claimed in claim 13, further comprising, when detecting that the baseband processing unit is still incapable of controlling the oscillation unit according to received bursts from the remote communication unit, and when a digital value corresponding to the first predetermined compensation adjustment reaches or exceeds a predetermined maximum, computing a second compensation adjustment according to a second prediction model and the first compensation adjustment, and adjusting the oscillation unit according to the second compensation adjustment.

20. The method as claimed in claim 19, the second prediction model is $X_{N+1}=-X_N$ or $X_{N+1}=-\beta \times X_N$, and $\alpha$ is greater than $\beta$.

21. The method as claimed in claim 19, further comprising computing a third compensation adjustment according to a third prediction model and the second compensation adjustment when detecting that the baseband processing unit is still incapable of controlling the oscillation unit according to received bursts from the remote communication unit, and when the digital value corresponding to the first predetermined compensation adjustment reaches or exceeds a predetermined maximum, and when the second compensation adjustment is determined.

22. The method as claimed in claim 21, the second prediction model is $X_{N+1}=-X_N$ or $X_{N+1}=-\beta \times X_N$, $\alpha$ is greater than $\beta$, and the third prediction model is $$X_{N+1} = \frac{X_N}{\alpha}$$

or $X_{N+1}=\beta \times X_N$.

* * * * *